United States Patent Office 2,933,172
Patented Apr. 19, 1960

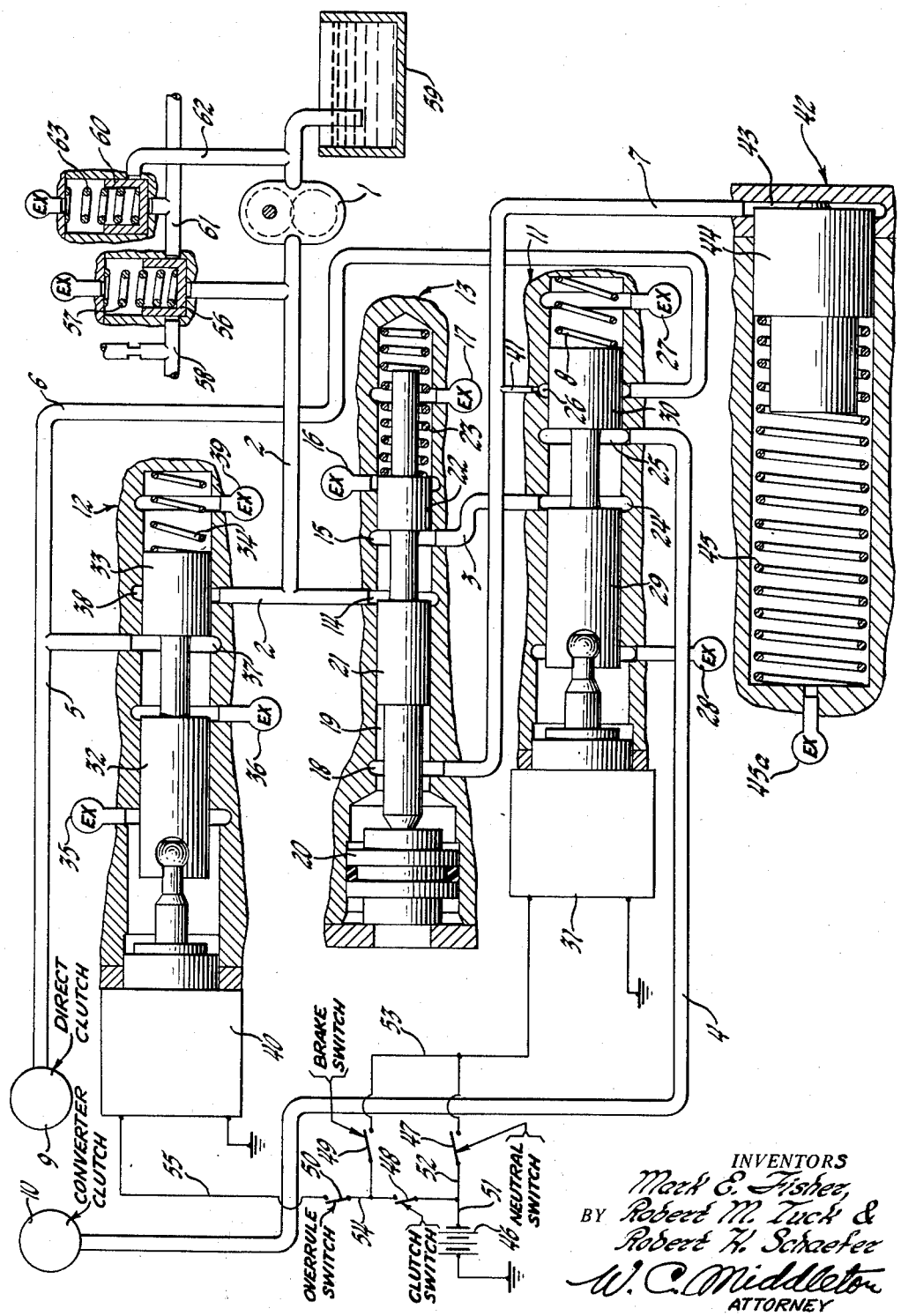

2,933,172

TRANSMISSION CLUTCH CONTROL SYSTEM

Mark E. Fisher, Carmel, and Robert M. Tuck and Robert H. Schaefer, Indianapolis, Ind., assignors to General Motors Corporation, Detroit, Mich., a corporation of Delaware Application June 12, 1958, Serial No. 741,587

12 Claims. (Cl. 192—87)

This invention relates to transmission control systems and more particularly to a control system for a transmission of the type having different clutches adapted to be operated selectively or simultaneously to provide different conditions of operation. A transmission of this type is shown and described in the application for United States Letters Patent of Hans Schjolin and Millis Parshall, Serial Number 592,935, now Patent No. 2,889,718, and accordingly the transmission details need not be repeated herein. The transmission to which the control system of the present application relates is of the type which includes a pair of clutches which may be actuated selectively to provide drive through a hydrodynamic torque converter or direct mechanical drive, or may be actuated jointly to provide engine braking.

An object of this invention is to provide a relatively simple control system for a transmission of the type having a pair of clutches adapted to be selectively engaged to provide torque transfer through different torque paths or to be engaged simultaneously to provide overrun vehicle braking.

Another object of this invention is to provide a control system for a transmission of the type having one clutch adapted to be engaged for drive through a hydrodynamic torque converter and a second clutch adapted to be engaged for direct drive independent of the torque converter wherein a solenoid actuated shift valve is effective to control each clutch, respectively, and wherein a converter clutch exhaust valve is movable in response to fluid pressure under control of the direct drive position of the direct drive clutch shift valve to release the converter clutch.

A further object of this invention is to incorporate in a control system of the class described, a shift valve for controlling one clutch, a second shift valve for controlling a second clutch, a third valve effective in one position thereof to connect the first-mentioned clutch to exhaust, and a passage adapted to connect the third valve to the second-mentioned clutch to release the first clutch upon complete engagement of the second clutch.

A more specific object of this invention is to incorporate in a control system of the class described a first shift valve normally positioned to direct fluid pressure to one clutch to apply the same, a second shift valve normally positioned to connect a second clutch to exhaust to release the same, a third valve normally positioned to direct pressure to the first-mentioned valve for supplying pressure to the first clutch through the first-mentioned valve and movable in response to pressure supplied to the second clutch by the second valve to block off the supply of pressure to the first clutch and to connect the first clutch to exhaust after the second clutch is fully engaged.

A further object of this invention is to provide a control system of the class described including a first shift valve directly actuated by a solenoid and normally biased to connect a first clutch to a fluid pressure source to apply the same, a second valve hydraulically positioned between the first shift valve and the fluid pressure source and normally positioned to connect the first shift valve to the fluid pressure source, and a third valve directly actuated by a solenoid for controlling the engagement of a second clutch, there being a passage between the third valve and a control chamber associated with the second-mentioned valve adapted to receive pressure delivered to the second clutch by the third valve, the second-mentioned valve being responsive to pressure in the control chamber associated therewith to block off the supply of fluid to the first-mentioned shift valve and to connect the first-mentioned clutch to exhaust after engagement of the second-mentioned clutch.

Another object of this invention is to provide a control system for controlling a pair of transmission clutches incorporating first and second valves for controlling one clutch, a third valve for controlling a second clutch, means yieldably biasing the first valve to connect the second valve to the fluid pressure source, means yieldably biasing the second valve to connect one clutch to the fluid pressure source, means for positioning the third valve to connect the second clutch to the fluid pressure source, and means responsive to pressure delivered to the second clutch for positioning the first valve to connect the first clutch to exhaust through the second valve.

These and other objects of this invention will be apparent from the following description and claims taken in conjunction with the accompanying drawing which is a schematic diagram of a control system constructed in accordance with the principles of this invention.

Referring to the figure there is shown schematically a control system embodying the principles of this invention for controlling the admission of fluid pressure to and exhaust of pressure from a pair of clutches 10 and 9. Clutch 10 is adapted to drive an impeller (not shown) of a hydrodynamic torque transmitting mechanism such as, for example, a hydraulic torque converter or a fluid coupling. Clutch 9 may be engaged and clutch 10 released to provide direct mechanical drive independent of the hydraulic torque converter. Both clutches 10 and 9 may be simultaneously engaged to provide overrun engine and hydrodynamic braking particularly useful in descending long grades.

A pair of solenoid actuated shift valves indicated generally at 11 and 12 and a fluid pressure controlled valve indicated generally at 13 control the admission of fluid pressure to and exhaust of fluid pressure from clutches 10 and 9. A fluid pressure source such as, for example, an engine driven pump 1 supplies fluid under pressure to a main line pressure supply passage 2. This passage terminates at a port 38 of direct drive clutch control valve 12 and at a port 14 of converter clutch exhaust valve 13. Converter clutch exhaust valve 13, which is positioned hydraulically between pump 1 and converter clutch control valve 11, is normally biased by a spring 23 to hydraulically connect pressure supply port 14 to a pressure delivery port 15. Converter clutch exhaust valve 13 is provided with a port 18 connected to a control chamber 19, an exhaust port 16, and a second exhaust port 17 adjacent spring 23. The valve includes a pair of spaced lands 21 and 22, there being a plug 20 for blocking off one end of control chamber 19.

A passage 3 connects port 15 of valve 13 to a port 24 of converter clutch control valve 11. Converter clutch control valve 11 includes a movable valve member having lands 29 and 30 and is provided with ports 24, 25, 26, 27 and 28. Port 24 receives pressure from passage 3. Port 25 connects to a converter clutch supply passage 4. Port 26 connects to a passage 6. Ports 27 and 28 are exhaust ports. A solenoid 31 may be energized or deenergized to control the position of converter clutch shift valve 11. When the solenoid is deenergized, a spring 8 positions valve 11 as illustrated such that port 24 is connected to port 25. When solenoid 31 is energized the valve 11 is moved to the right to connect port 25 to port 26 and to block off port 24.

Direct drive clutch control valve 12 includes a pair of spaced lands 32 and 33 and ports 35, 36, 37, 38 and 39. Ports 35 and 36 are exhaust ports. Port 37 connects to a direct drive clutch supply passage 5. Port 38 connects to main line pressure supply passage 2. Port 39 connects to exhaust. The position of valve 12 may be controlled by a solenoid 40. When the solenoid 40 is deenergized, passages 5 and 6 are connected to exhaust by way of ports 37 and 36 and port 38 is blocked off by land 33. When solenoid 40 is energized the valve 12 moves to the right to connect port 37 to port 38 to deliver pressure to direct drive clutch pressure supply passage 5 and branch passage 6. A spring 34 positions valve 12 in the position illustrated when solenoid 40 is deenergized.

Branch passage 6 connects direct drive clutch pressure supply passage 5 to a port 26 of converter clutch control valve 11. A restriction 41 disposed between port 26 and a passage 7 connects port 26 of valve 11 to a passage 7 leading to an accumulator chamber 43 and to port 18 of control chamber 19 of converter clutch release valve 13. The arrangement is such that upon admission of pressure to direct drive clutch supply passage 5, the pressure in passage 6 flows through port 26 and restriction 41 even though land 30 of valve 11 blocks off port 26 from port 25. Thus, passages 5, 6 and 7 are continuously in communication with each other. When solenoid 31 is energized, passages 5, 6 and 7 are connected to passage 4 through ports 25 and 26 of valve 11. When solenoid 40 is energized, passages 5, 6 and 7 are connected to passage 2 through ports 37 and 38 of valve 12. The action of the accumulator indicated generally at 42 and restriction 41 is such as to delay the rate at which pressure is built up in passage 7 such that pressure in chamber 19 is not sufficient to move valve 13 to block off port 14 and connect port 15 to exhaust port 16 until the pressure in clutch 9 is sufficient to fully engage clutch 9. Thus, there is an interval in which both clutches 10 and 9 are simultaneously engaged in shifting from drive by clutch 10 to drive by clutch 9. The accumulator 42 consists of a spring 45 acted upon by a piston 44. The rate of pressure build up in control chamber 19 is determined by the size of restriction 41, the diameter of piston 44 and the weight of spring 45. Port 45a is an exhaust port.

The position of valves 11 and 12 is controlled by an electrical system including a battery 46, a neutral switch 47, a direct drive clutch switch 48, a converter brake switch 49, and an overrule switch 50. The neutral switch 47 is normally open, but may be closed by the vehicle operator at his selection. The direct drive clutch switch 48 is controlled by a vehicle speed responsive governor, not shown, and is normally open at speeds below a predetermined vehicle speed, for example 18 miles per hour and is normally closed at speeds above the predetermined vehicle speed. The overrule switch 50 is normally closed but may be opened through a suitable linkage, not shown, controlled by a vehicle accelerator pedal, not shown, such that the switch 50 may be opened to overrule governor switch 48 when the accelerator pedal is fully depressed. A converter braking switch 49 is normally open but may be closed by the vehicle operator when descending a long grade or for any other reason to provide hydrodynamic braking.

*Positive neutral*

In order to establish a positive neutral wherein the engine may be raced without driving the vehicle, the neutral switch 47 may be manually closed to connect battery 46 to neutral solenoid 31 by way of electrical conductors 51, 52 and 53. The solenoid 31 when energized positions converter clutch control valve 11 such that pressure supply passage 3 is blocked off at port 24 and converter clutch supply passage 4 is connected to passage 6 by way of ports 25 and 26. Assuming the vehicle to be standing still, governor switch 48 will be open so that direct drive clutch solenoid 40 will be deenergized. The valve 12 will be positioned as shown such that passages 4, 5 and 6 will be connected to exhaust by way of ports 37 and 36. Thus, for positive neutral or no drive operation, both the converter clutch 10 and direct drive clutch 9 are connected to exhaust through exhaust port 36 of the direct drive clutch solenoid valve 12.

*Starting the vehicle*

To start the vehicle in motion from a standstill, the neutral clutch switch 47 is open to deenergize solenoid 31. The valve 11 will be biased by spring 8 to the position illustrated. Fluid pressure is supplied to converter drive clutch 10 by way of passage 2, ports 14 and 15 of valve 13, passage 3, ports 24 and 25 of valve 11, and passage 4. Due to the fact that governor controlled switch 48 is open, clutch 9 is connected to exhaust through ports 37 and 36 of valve 12. Drive of the vehicle is initially solely through converter drive clutch 10.

*Shift from converter drive to direct drive*

Upon acceleration of the vehicle to a predetermined speed, for example 18 miles per hour, the vehicle speed responsive governor controlled switch 48 will close to energize solenoid 40 through conductors 54 and 55. The overrule switch 50 is closed. Valve 12 is moved by solenoid 40 against spring 34 to connect port 37 to port 38, thereby connecting passage 2 to passages 5, 6 and 7. The pressure in passage 6 is fed through port 26 of valve 11 and restriction 41 to passage 7. Land 30 of valve 11 is not effective to block off passage 6 from passage 7 in any position of valve 11. Pressure in passage 7 is directed to accumulator chamber 43 and control chamber 19 of valve 13. The pressure in passage 5 will build up quickly to apply direct drive clutch 9. Due to the action of accumulator 42 and restriction 41, the pressure in chamber 19 will build up more slowly than that in passage 5 and clutch 9. Valve 13, therefore will not move against spring 23 a sufficient distance to connect port 15 to exhaust port 16 until clutch 9 is fully engaged. It will be noted that land 21 of valve 13 first blocks off port 14 before port 15 is connected to exhaust port 16. This prevents dumping of main line pressure from passage 2. The accumulator and orifice 41 provide a time lag in the movement of valve 13 to the position where it exhausts clutch 10 to insure full application of clutch 9 prior to exhaust of pressure from clutch 10. There is thus a momentary time interval in which both clutches 9 and 10 are engaged.

*Hydrodynamic braking*

Assuming the vehicle is operating at a sufficient speed that governor switch 48 is closed to cause valve 12 to engage clutch 9, the converter brake switch 49 may be manually closed to energize solenoid 31 by way of conductors 51, 54 and 53. This will position converter clutch control valve 11 such that land 29 is effective to block off port 24 and land 30 is moved to connect port 25 to port 26. Direct drive clutch engaging pressure is thereby admitted to converter clutch 10 to engage the clutch by way of passage 2, passage 6, ports 26 and 25 and passage 4. It will be noted that at this time, converter exhaust valve 13 is positioned to connect passage 3 to exhaust. However, due to the action of land 29, the pressure in passage 6 and passage 4 is blocked off from passage 3. When solenoid 31 is energized, valve 11 is effective to connect passages 4 and 6 on the upstream side of orifice 41, so that quick action is had without any restricting effect on the part of restriction 41. The switch 49 may be operated manually from within the vehicle cab, but is preferably actuated either by a suitable linkage to the accelerator pedal (not shown) so as to be closed when the accelerator pedal is fully released, or by a suitable linkage connected to the brake pedal (not shown) such that the switch will be closed when the brakes are applied. In either event, the switch 49 can be effective only at times when the vehicle speed is sufficient to close governor switch 48. At speeds wherein governor switch 48 is open, the converter brake switch 49 will be ineffective to energize solenoid 31.

*Forced downshift*

A governor overrule switch 50 is normally closed but may be actuated by a suitable linkage from the vehicle accelerator pedal (not shown) to be opened upon depression of the accelerator pedal to a fully open throttle position. Assuming that the vehicle is operating at a sufficiently high speed such that governor switch 48 is closed, drive will be through direct drive clutch 9. Now if overrule switch 50 is opened by fully depressing the accelerator pedal (not shown) direct drive clutch solenoid 40 will be deenergized. Passage 5 will be connected to exhaust through ports 37 and 36 of valve 12. This releases direct drive clutch 9. Pressure in control chamber 19 of converter clutch exhaust valve 13 will drain out through orifice 41 and passage 6, permitting spring 23 to position valve 13 to admit fluid pressure from passage 2, through ports 14 and 15 of valve 13, passage 3, ports 24 and 25 of valve 11 and passage 4 to apply converter clutch 10. Due to the momentary delay in movement of valve 13 occasioned by the action of orifice and accumulator 42, the vehicle engine is permitted to speed up so that the engine revolutions correspond to the reduction drive ratio of the converter at the time converter drive clutch 10 is engaged. The engagement of converter clutch 10 under forced downshift conditions is, therefore, a smooth engagement without torque reaction.

*Normal downshift*

Assuming that the vehicle is operating in direct drive, clutch 9 will be engaged and clutch 10 released. Upon a drop in vehicle speed to a speed below a predetermined speed, for example 18 miles per hour, the vehicle speed responsive governor switch 48 will open to deenergize solenoid 40. The solenoid spring 34 will thereupon position valve 12 as illustrated to connect clutch 9 to exhaust through ports 37 and 36. The exhaust of pressure in passages 7 and 6 dumps pressure from control chamber 19 of converter clutch exhaust valve 13 to permit spring 23 to position valve 13 to connect passage 2 to passage 3. The converter clutch apply pressure is thereupon conducted through valve 11 to passage 4 to apply the converter drive clutch.

It will be apparent that the control system is simple, economical to manufacture, and requires a minimum amount of hydraulic pipes and valves. The arrangement including the two valves 11 and 12 each directly actuated by its own solenoid and the single converter clutch exhaust valve 13 which is controlled by direct drive clutch apply pressure is believed to be novel.

The solenoid 31 is normally deenergized so that conduit 3 is normally connected to conduit 4. With the vehicle standing still or operating at a speed below a predetermined speed, solenoid 31 may be energized to establish positive neutral or no drive by closing switch 47 to position valve 11 to block off passage 3 from passage 4 and to connect passage 4 to exhaust through passage 6 and exhaust port 36 of valve 12 to release clutch 10. In this condition of operation, clutch valve 13 will be moved by spring 23 to admit line pressure from passage 2 to passage 3. Land 29 of valve 11, however, blocks off passage 3 from passage 4 so that the converter clutch 10 cannot be engaged. In the event that the vehicle is operating at sufficient speed to close switch 48 at the time converter brake switch 49 is closed, the clutch 9 will be engaged by action of solenoid 40 and solenoid 31 will move valve 11 to connect passage 6 to passage 4 through ports 25 and 26 of valve 11. Passage 3 will be blocked off from passage 4 by land 29. Direct drive clutch pressure will therefore be admitted to clutch 10 to engage the converter clutch. Pressure in passage 7 will build up to move valve 13 to block off passage 2 and connect passage 3 to exhaust. However, the land 29, by blocking passage 3 prevents exhaust of pressure from passage 4. In the event of power failure, the solenoid spring will position the valves 11 and 12 in the position shown such that converter clutch 10 will be engaged.

At the top right hand portion of the figure there are shown two valves 56 and 60. Valve 56 is a main line pressure regulator valve for passage 2, the valve 56 being movable against a spring 57 to dump pressure from passage 2 to a passage 58 for lubrication purposes. Oil from passage 58 is permitted to return to a sump 59 after being used for lubrication purposes through a passage, not shown. Valve 60 is used to control pressure in a torque converter, not shown, the valve 60 being movable against a spring 63 to dump pressure from a passage 61 to a return passage 62 leading to sump 59.

The preceding description recites the advantages, features, objects and useful results of this invention which incorporate a number of features in combination which are subject to change in specific arrangement and form of structure without departing from the spirit and scope of the invention as set forth in the following claims.

We claim:

1. In a control system for controlling first and second transmission clutches, a fluid pressure source, means including first and second valves for controlling said first clutch, a third valve for controlling said second clutch, means normally biasing said first and second valves, respectively, to admit fluid pressure from said source to said first clutch to engage the same, means normally biasing said third valve to connect said second clutch to exhaust, means operable to position said third valve to connect said second clutch to said fluid pressure source to engage the same, fluid pressure responsive means associated with said first valve responsive to fluid pressure delivered to said second clutch for positioning said first valve to connect said first clutch to exhaust to release said first clutch, and selectively operable means for positioning said second valve to hydraulically connect said first clutch to said second clutch for simultaneous engagement of said clutches when said third valve is positioned to connect said second clutch to said fluid pressure source.

2. In a control system for controlling first and second transmisison clutches, a fluid pressure source, means including first and second valves for controlling said first clutch, a third valve for controlling said second clutch, means normally biasing said first and second valves, respectively, to admit fluid pressure from said source to said first clutch to engage the same, means normally biasing said third valve to connect said second clutch to exhaust, means operable to position said third valve to connect said second clutch to said fluid pressure source to engage the same, fluid pressure responsive means associated with said first valve hydraulically connected to said second clutch for positioning said first valve to connect said first clutch to exhaust, means in said hydraulic connection including a restriction and an accumulator for delaying the release of said first clutch until said second clutch is fully engaged, and selectively operable means for positioning said second valve to hydraulically disconnect said first clutch from said first valve and to hydraulically connect said first clutch to said second clutch through said hydraulic connection to simultaneously engage said clutches when said third valve is positioned to connect said second clutch to said source of fluid pressure.

3. In a control system for controlling first and second transmission clutches, a fluid pressure source, means including first and second valves connected in series for controlling engagement and release of said first clutch, means normally biasing said first and second valves, respectively, to connect said first clutch to said fluid pressure source to engage said first clutch, a third valve for controlling engagement and release of said second clutch connected to said fluid pressure source, a control chamber associated with said first-mentioned valve, passage means connecting said control chamber to said second clutch, means normally biasing said third valve to connect said passage means to exhaust, control means for positioning said third valve to connect said passage means to said fluid pressure source, said first valve being movable in response to pressure delivered to said control chamber through said third valve and said passage means to block off said second valve from said fluid pressure source and to connect said first clutch to exhaust, and means for positioning said second valve to connect said first clutch to said second clutch through said passage means to simultaneously engage said clutches.

4. In a control system for controlling first and second transmission clutches, a fluid pressure source, means including first and second valves connected in series for controlling engagement and release of said first clutch, means yieldably biasing said first and second valves, respectively, to connect said first clutch to said fluid pressure source to engage said first clutch, a third valve for controlling engagement and release of said second clutch, a control chamber associated with said first valve, passage means connecting said control chamber to said second clutch, means yieldably biasing said third valve to connect said passage means to exhaust, control means for positioning said third valve to connect said passage means to said fluid pressure source, said first valve being movable in response to fluid pressure delivered to said control chamber through said third valve and said passage means to block off said second valve from said fluid pressure source and to connect said first clutch to exhaust, means for controlling the rate of rise of fluid pressure in said control chamber including a restriction and an accumulator in said passage, and manually operable control means for positioning said second valve to hydraulically connect said first clutch to said second clutch through said passage.

5. In a control system for controlling first and second transmission clutches, a fluid pressure source, means including first and second valves for controlling said first clutch, a third valve for controlling said second clutch, means normally biasing said first and second valves, respectively, to connect said first clutch to said fluid pressure source to engage the same, means normally biasing said third valve to connect said second clutch to exhaust, means operable to position said third valve to connect said second clutch to said fluid pressure source to engage said second clutch, fluid pressure responsive means operatively associated with said first valve and hydraulically connected to said second clutch responsive to fluid pressure in said second clutch for positioning said first valve to connect said first clutch to exhaust to release the same, and selectively operable means for positioning said second valve to hydraulically connect said first clutch to said second clutch to simultaneously engage said clutches.

6. In a control system for controlling first and second transmission clutches, a fluid pressure source, means including first and second valves for controlling said first clutch, a third valve for controlling said second clutch, spring means yieldably biasing said first valve to connect said second valve to said fluid pressure source, spring means yieldably biasing said second valve to connect said first clutch to said fluid pressure source through said first valve, spring means yieldably biasing said third valve to connect said second clutch to exhaust, a control chamber associated with said first valve hydraulically connected to said second clutch, said first valve being movable in response to pressure in said control chamber to block off said second valve from said fluid pressure source and to connect said first clutch to exhaust through said second valve in one position of said second valve, means for positioning said third valve to connect said second clutch to said fluid pressure source to engage the same, and electrically controlled means for positioning said second valve to block off said first clutch from said first valve and to hydraulically connect said first clutch to said second clutch.

7. In a control system for controlling first and second transmission clutches, a fluid pressure source, means including first and second valves for controlling said first clutch, spring means yieldably biasing said first valve to connect said second valve to said fluid pressure source, spring means yieldably biasing said second valve to connect said first clutch to said fluid pressure source through said first valve, a third valve for controlling said second clutch, spring means yieldably biasing said third valve to connect said second clutch to exhaust, a control chamber associated with said first valve, a hydraulic connection between said control chamber and said second clutch, said first valve being movable in response to pressure in said control chamber to block off said second valve from said fluid pressure source and to connect said first clutch to exhaust through said second valve, means for positioning said third valve to direct pressure to said second clutch and to said control chamber, means for controlling the rate of pressure rise in said control chamber including a restriction and an accumulator in said hydraulic connection, and manually operable control means for positioning said second valve to block off said first clutch from said first valve and to hydraulically connect said first clutch to said second clutch through said hydraulic connection.

8. In a control system for controlling first and second transmission clutches, a fluid pressure source, means for controlling said first clutch including a first valve connected to said source and a second valve hydraulically connected in series with said first valve, a third valve for controlling said second clutch connected to said source, spring means yieldably biasing said first valve to connect said second valve to said source, spring means yieldably biasing said second valve to connect sad first clutch to said source through said first valve, spring means yieldably biasing said third valve to connect said second clutch to exhaust, a control chamber associated with said first valve hydraulically connected to said second clutch, said first valve being movable responsive to pressure in said control chamber to connect said first clutch to exhaust through said second valve when said second valve is positioned to connect said first clutch to said first valve, means for positioning said third valve to connect said second clutch and said control chamber to said fluid pressure source, and means for positioning said second valve to hydraulically connect said first clutch to said second clutch.

9. In a control system for controlling first and second transmission clutches, a fluid pressure source, means including first and second valves for controlling said first clutch, spring means yieldably biasing said first valve to connect said second valve to said fluid pressure source, spring means yieldably biasing said second valve to connect said first clutch to said fluid pressure source through said first valve, a third valve for controlling said second clutch, spring means yieldably biasing said third valve to connect said second clutch to exhaust, a control chamber associated with said first valve, a hydraulic connection between said control chamber and said second clutch, said first valve being movable in response to pressure in said control chamber to connect said first clutch to exhaust through said second valve when said second valve is positioned to connect said first clutch to said first valve, means for positioning said third valve to connect said second clutch and said control chamber to said fluid pressure source, means for controlling the rise of pressure in said control chamber including a restriction and an accumulator in said hydraulic connection, and means for positioning said second valve to hydraulically connect said first clutch to said second clutch through said hydraulic connection.

10. In a control system for controlling first and second transmission clutches, a fluid pressure source, means including first and second valves for controlling said first clutch, spring means yieldably biasing said first valve to connect said second valve to said fluid pressure source, spring means yieldably biasing said second valve to connect said first clutch to said fluid pressure source through said first valve, a third valve for controlling said second clutch, spring means yieldably biasing said third valve to connect said second clutch to exhaust, a control chamber associated with said first valve, a hydraulic connection between said control chamber and said second clutch, said first valve being movable in response to pressure in said control chamber to connect said first clutch to exhaust when said second valve is positioned to connect said first clutch to said first valve, means for positioning said third valve to connect said second clutch and said control chamber to said fluid pressure source, means for controlling the rise of pressure in said control chamber including a restriction and an accumulator in said hydraulic connection positioned in said connection on the downstream side of said second valve, and means for positioning said second valve to hydraulically connect said first clutch to said second clutch through said hydraulic connection on the upstream portion of said connection from said restriction.

11. In a control system for controlling first and second transmission clutches, a fluid pressure source, means for controlling said first clutch including a first valve connected to said source and a second valve hydraulically connected in series with said first valve, a third valve for controlling said second clutch connected to said source, spring means yieldably biasing said first valve to connect said second valve to said fluid pressure source, spring means yieldably biasing said second valve to connect said first clutch to said fluid pressure source through said first valve, spring means for positioning said third valve to connect said second clutch to exhaust, a control chamber associated with said first valve hydraulically connected to said second clutch and said third valve, said first valve being movable responsive to pressure in said control chamber to connect said first clutch to exhaust through said second valve when said second valve is positioned to connect said first clutch to said first valve, a solenoid directly connected to said third valve and effective when energized to position said third valve to connect said second clutch and said control chamber to said fluid pressure source, means for controlling the actuation of said solenoid, a solenoid directly connected to said second valve effective when energized to position said second valve to connect said first clutch to said second clutch, and means for controlling the actuation of said last-mentioned solenoid.

12. In a control system for controlling first and second transmission clutches, a fluid pressure source, means including first and second valves for controlling said first clutch, spring means yieldably biasing said first valve to connect said second valve to said fluid pressure source, spring means yieldably biasing said second valve to connect said first clutch to said fluid pressure source through said first valve, a third valve for controlling said second clutch, spring means yieldably biasing said third valve to connect said second clutch to exhaust, a control chamber associated with said first valve, a passage between said second clutch and said control chamber, said first valve being movable in response to pressure in said control chamber to connect said first clutch to exhaust through said second valve when said second valve is positioned to connect said first clutch to said first valve, a solenoid directly connected to said third valve and adapted to position said third valve to connect said second clutch and said control chamber to said fluid pressure source when energized, means for controlling the actuation of said solenoid, means in said passage for controlling the rise of pressure in said control chamber including a restriction and an accumulator, a solenoid directly connected to said second valve adapted to position said second valve to connect said second clutch to said first clutch through said passage when said last-mentioned solenoid is energized, and means for controlling the actuation of said solenoid.

References Cited in the file of this patent
UNITED STATES PATENTS

| | | |
|---|---|---|
| 2,738,689 | Dodge | Mar. 20, 1956 |
| 2,794,349 | Smirl | June 4, 1957 |
| 2,833,162 | Forster | May 6, 1958 |